Oct. 31, 1944.   J. R. McLAUGHLIN   2,361,783
METHOD OF AND APPARATUS FOR ASSEMBLING PLUG IN APPLICATORS
Filed Oct. 23, 1942   9 Sheets-Sheet 1

FIG. 1.

INVENTOR.
JOHN R. McLAUGHLIN.
BY 
ATTORNEY.

FIG.3.

INVENTOR.
JOHN R. MCLAUGHLIN.
BY
ATTORNEY.

Oct. 31, 1944. J. R. McLAUGHLIN 2,361,783
METHOD OF AND APPARATUS FOR ASSEMBLING PLUG IN APPLICATORS
Filed Oct. 23, 1942 9 Sheets-Sheet 4

INVENTOR.
JOHN R. MCLAUGHLIN.
BY
ATTORNEY

Oct. 31, 1944.　　　J. R. McLAUGHLIN　　　2,361,783
METHOD OF AND APPARATUS FOR ASSEMBLING PLUG IN APPLICATORS
Filed Oct. 23, 1942　　　9 Sheets-Sheet 5

FIG. 7.

INVENTOR.
JOHN R. MCLAUGHLIN.
BY 
ATTORNEY.

Oct. 31, 1944. J. R. McLAUGHLIN 2,361,783
METHOD OF AND APPARATUS FOR ASSEMBLING PLUG IN APPLICATORS
Filed Oct. 23, 1942 9 Sheets-Sheet 7

INVENTOR.
JOHN R. MCLAUGHLIN.
BY
ATTORNEY.

Oct. 31, 1944.    J. R. McLAUGHLIN    2,361,783
METHOD OF AND APPARATUS FOR ASSEMBLING PLUG IN APPLICATORS
Filed Oct. 23, 1942    9 Sheets-Sheet 8

INVENTOR.
JOHN R. MCLAUGHLIN.
BY
ATTORNEY.

Oct. 31, 1944.   J. R. McLAUGHLIN   2,361,783
METHOD OF AND APPARATUS FOR ASSEMBLING PLUG IN APPLICATORS
Filed Oct. 23, 1942   9 Sheets-Sheet 9

INVENTOR.
JOHN R. McLAUGHLIN.
BY
ATTORNEY.

Patented Oct. 31, 1944

2,361,783

UNITED STATES PATENT OFFICE 2,361,783

METHOD OF AND APPARATUS FOR ASSEMBLING PLUGS IN APPLICATORS

John R. McLaughlin, New Brunswick, N. J., assignor, by mesne assignments, to Tampax, Incorporated, New York, N. Y., a corporation of Delaware Application October 23, 1942, Serial No. 463,094

15 Claims. (Cl. 226—18)

The present invention relates to a method of and an apparatus for automatically inserting cotton plugs in applicators which are used for sanitary purposes, and it has more particular relation to an automatic apparatus for and method of assembling an article such as a catamenial device. This invention is a continuation-in-part of my copending application Serial Number 345,605 and filed July 15, 1940.

It is the principal object of this invention to provide an improved method of assembling plugs into applicators and accomplish this with a highly efficient machine which will rapidly, automatically and dependably perform its functions.

Another object of this invention is to simplify the construction of an apparatus of the character contemplated herein and to improve the operation of such apparatus.

Still another object is to provide a machine which will receive the compacted cotton plugs and also the applicator tubes, and then telescope these elements in an improved manner.

A further object of this invention is to provide an apparatus which will handle the cotton plugs and applicator tubes, the latter being formed of paper material, without damage to these said members.

A still further object is to provide a machine which will properly position the withdrawing string of the cotton plug with relation to the tubular applicator.

Still a further object is to provide an improved method of assembling catamenial plugs having attached pull strings into applicators therefor.

Additional objects, aims and advantages of the present invention will be apparent to persons skilled in the art after the construction and operation of the apparatus is understood from the within description. Among these additional objects may be mentioned that the invention aims to provide an apparatus possessing a high degree of novelty; which is efficient in performing its required functions; which is made of sturdy parts so as to render it capable of withstanding severe usage; and which is comparatively economical to manufacture.

It is preferred to accomplish the above-mentioned objects and to practice this invention in substantially the manner herein described and as more particularly pointed out in the appended claims, reference being made to the accompanying drawings forming a part of this specification.

In the drawings.

The drawings, which are to be understood as being more or less of a schematic character, disclose a typical or preferred embodiment of the present invention, and in these drawings like reference characters are employed to identify the same parts wherever these parts appear in the different views.

Figure 4:
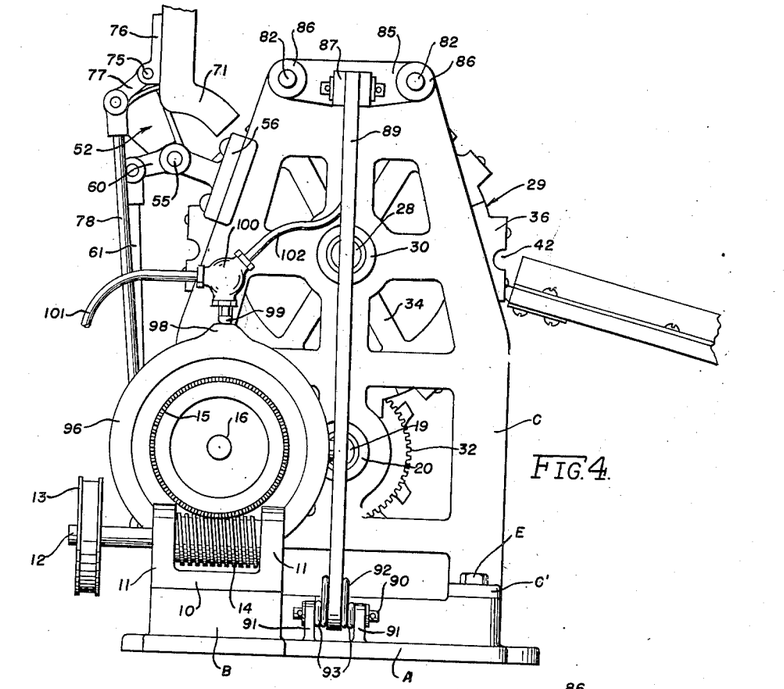
Figure 4 is a vertical elevation looking at the left or driving end of the apparatus shown in Figures 1 and 2.
Figure 5:
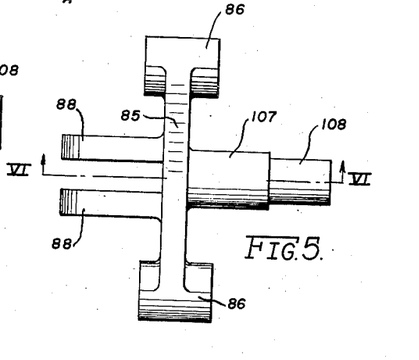
Figure 5 is a plan view of the string ejector nozzle used in connection with this apparatus.

The instrumentalities for performing the functions of this apparatus are mounted in a suitable supporting frame which comprises a rectangular base A which has a lateral extension B adjacent one corner, and at its ends is provided with vertical side-frames C and D which are anchored to said base by means of heavy bolts E passed through the lateral feet C' and D' of said C and D side-frames and screwed into said base A. These side-frames C and D are preferably unitary castings having a plurality of spaced uprights and cross members, and have their upper portions tapered or converged inwardly as shown in Figure 4.

A bearing block 10, which is secured to the extension B, is provided with upstanding spaced lugs 11 which are bored to journal a horizontal drive-shaft 12 having a drive-pulley 13 on one of its ends and having a worm 14 secured to it between its bearings. This worm 14 meshes with and rotates a worm-gear 15 secured to the adjacent end of the main actuating or cam shaft 16 which is journaled near its ends in bearings 17 and 18 in the lower rear portions of the respective side frames C and D. Disposed with its axis parallel and in the same horizontal plane with the main-shaft 16 is a transmission shaft 19 which extends between the side-frames C and D and has its end portions journaled in bearings 20 and 21 on the central lower portions of the respectvie side-frames.

Figures 8, 9, 10:
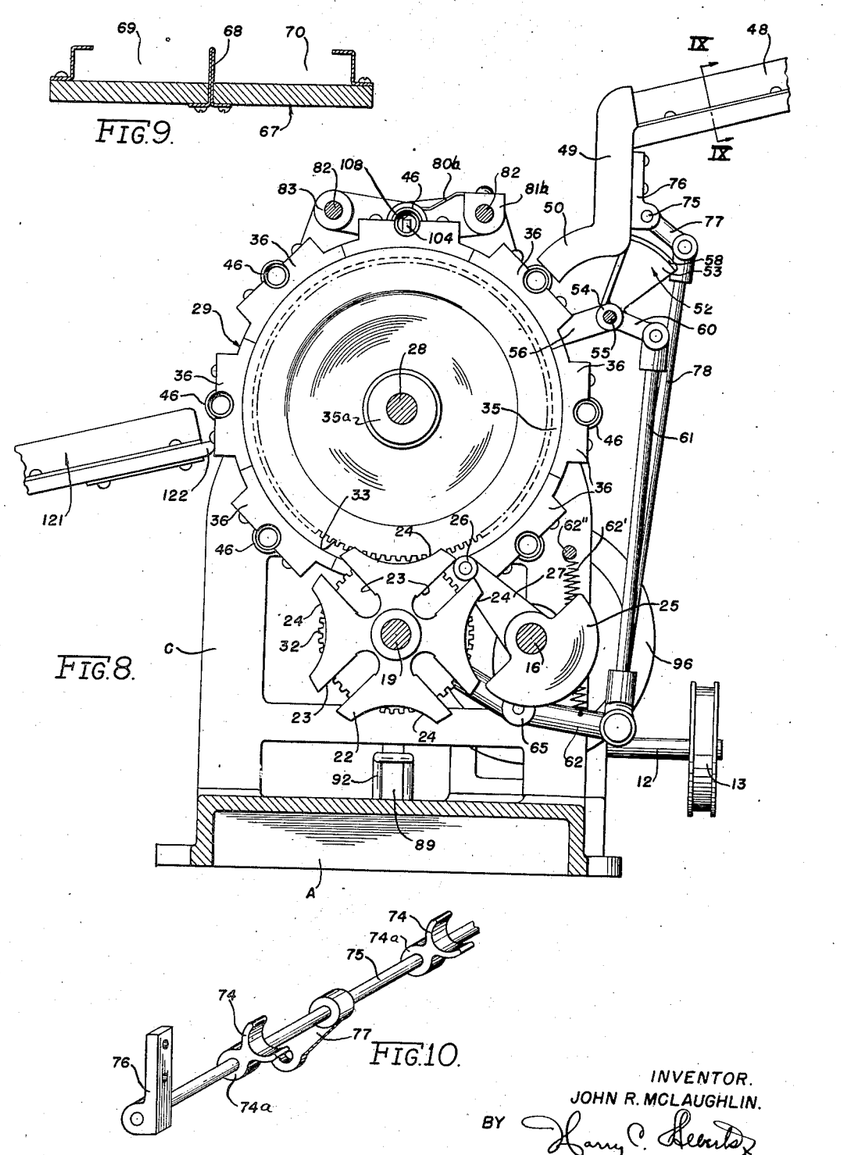
Figure 8 is a vertical transverse section taken along line VIII—VIII of Figure 1.
Figure 9 is a transverse sectional view of the tube conveyor chute taken along line IX—IX of Figure 8.
Figure 10 is a perspective view of the tube feeding assembly detached from the apparatus.
Figure 13:
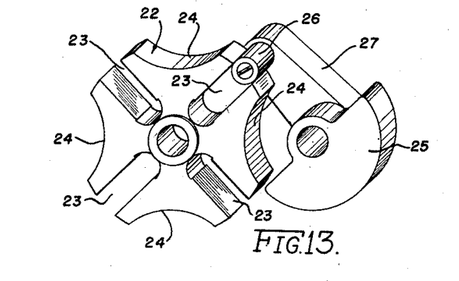
Figure 13 is a perspective view of the operating cam device such as used in this apparatus.

The transmission shaft 19 is intermittently rotated by the main-shaft 16 through the medium of a Geneva movement or escapement device located near the side-frame D and shown in detail in Figures 8 and 13. The devices just mentioned comprise a Geneva-wheel 22 the hub of which is secured to transmission shaft 19 and the wheel has radial slots 23 while its periphery between these slots is provided with arcuate recesses 24 which accommodate the segmental or semi-circular disk 25 which is secured to an alined portion of the worm-shaft 16. The slots 23 of the wheel are successively engaged by a roller 26 upon the outer end of a crank-arm 27 projecting radially from segmental disk 25 in a diametrically opposite direction thereto. The continuous rotation of mainshaft 16 is transposed, through the medium of the Geneva-movement, into the intermittent rotation of the transmission shaft 19.

Above the transmission shaft 19 and with its axis parallel therewith is a horizontal shaft 28 for supporting and rotating a large drum which is designated as a whole as 29, and the end portions of said shaft 28 are journaled in bearings 30 and 31 on adjacent portions of the respective side-frames C and D. This shaft 28 is rotated by means of a pinion 32 fast on shaft 19 that meshes with and rotates a large gear 33 fast on the shaft 28 and which is positioned alongside the drum 29.

Figure 7:
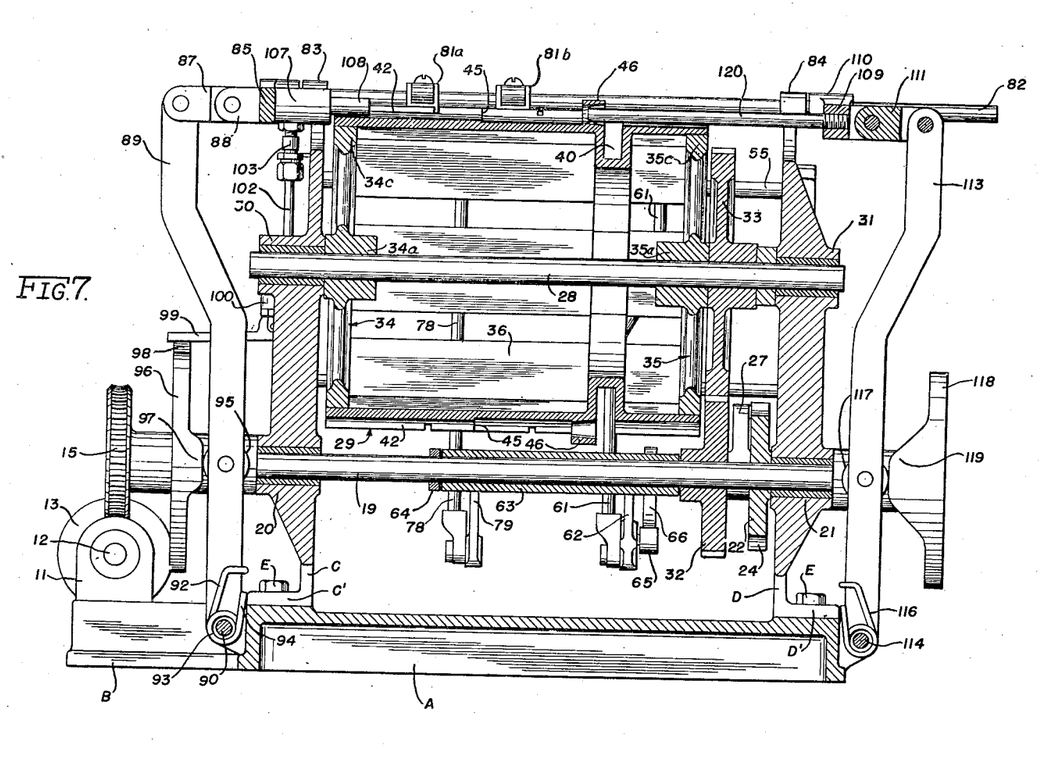
Figure 7 is a longitudinal section of the apparatus taken along line VII—VII of Figure 1.
Figures 11, 12:
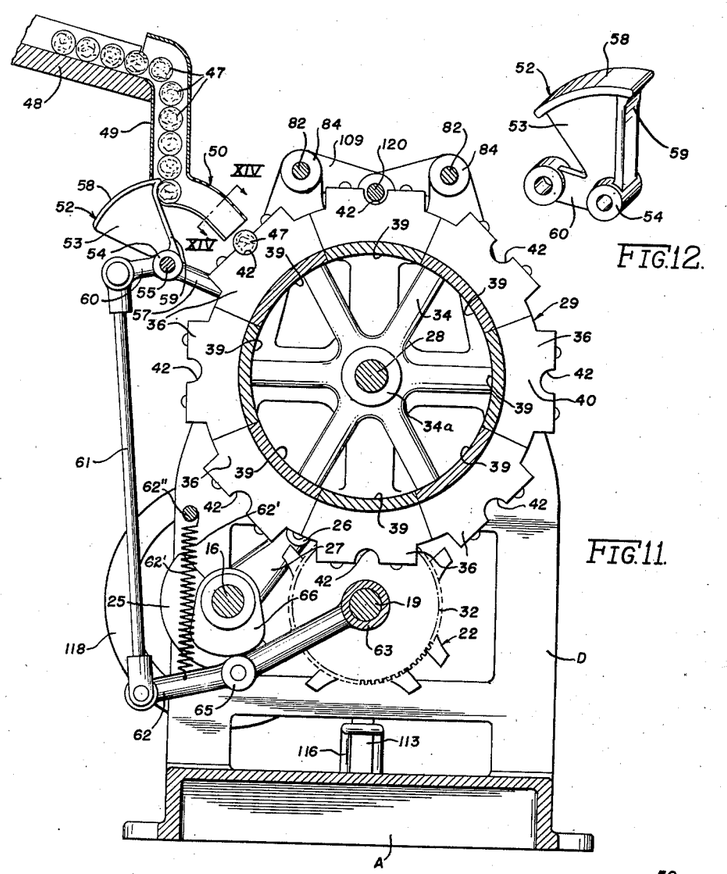
Figure 11 is a vertical transverse section of the apparatus taken along line XI—XI of Figure 1.
Figure 12 is a perspective view of the plug feeder finger detached from the apparatus.
Figures 15, 16:
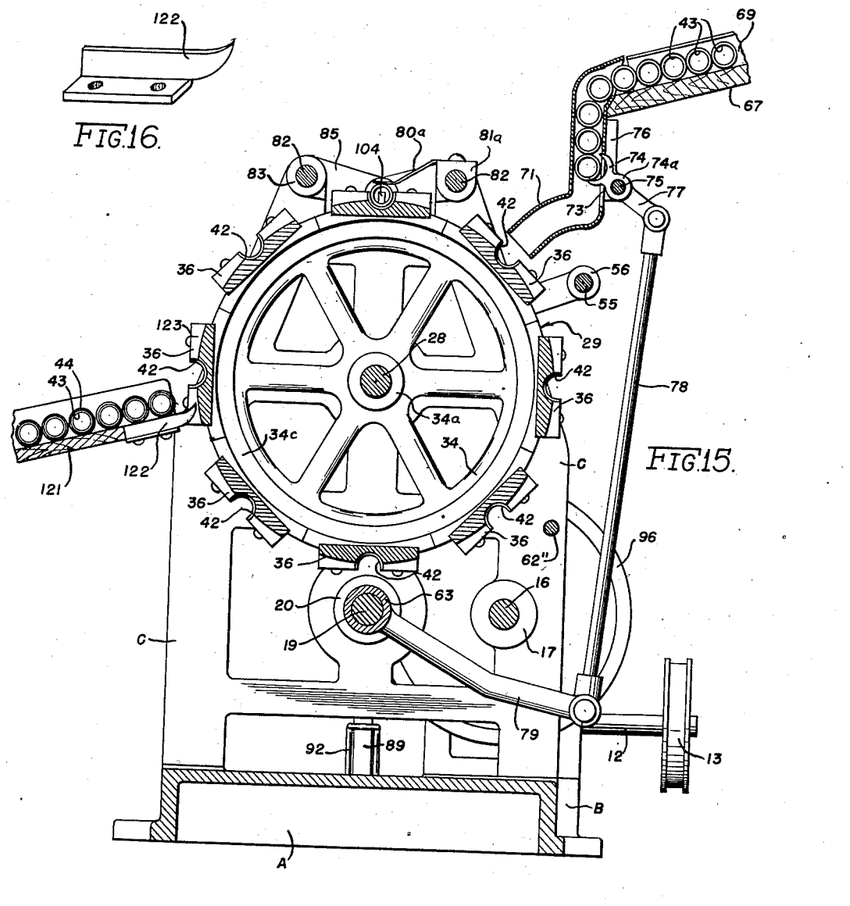
Figure 15 is a transverse vertical sectional view of the machine taken along line XV—XV of Figure 1.
Figure 16 is a perspective view of the assembled applicator stripper finger.
Figure 17:
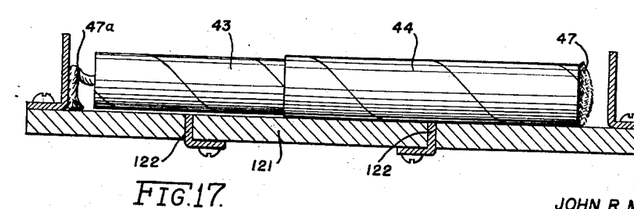
Figure 17 is a sectional view of the discharge chute for assembled plugs and tubes taken along line XVII—XVII of Figure 1.
Figure 18:
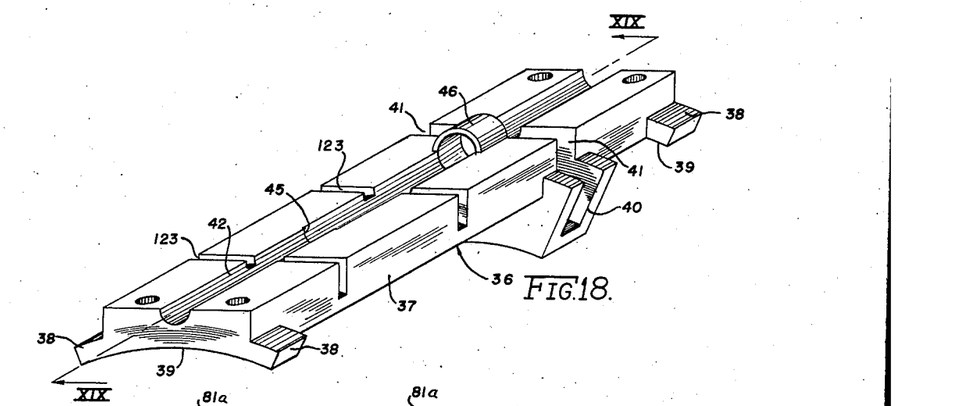
Figure 18 is a perspective view of a segment of the assembling drum.
Figure 19:
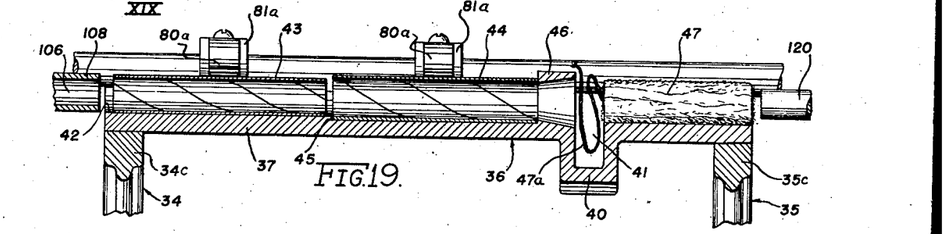
Figure 19 is a sectional view taken along line XIX—XIX of Figure 18 showing the tubes and plug before assembly.
Figure 20:
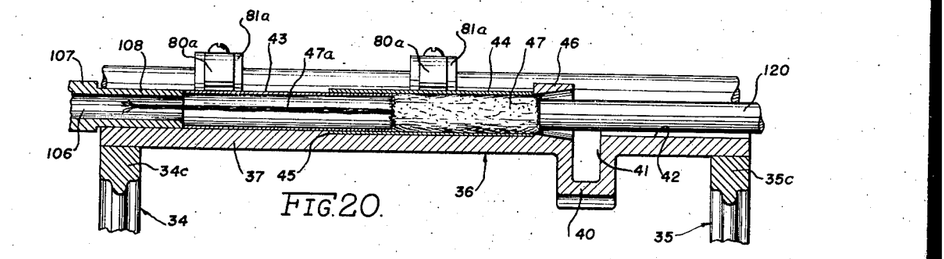
Figure 20 is a sectional view, similar to Figure 19, which shows the tubes and plug assembled.
Figure 21:
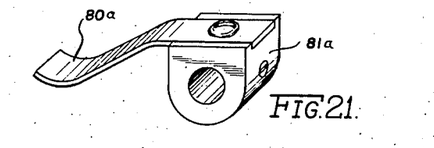
Figure 21 is a perspective view of the holding member for the tubes in the drum segment.

The drum is preferably an assembled composite structure embodying end wheels 34 and 35 having hubs 34a and 35a to which latter a plurality of segments 36 are suitably secured and extend from one wheel to the other, substantially as shown in Figures 7, 11 and 15. The details of one of these segments are illustrated in Figures 18 to 20. The segment is preferably an elongated cast bar 37 provided with lateral end lugs 38 which are, together with the adjacent portions of the bar 37 provided with arcuate under surfaces 39 to accommodate them to the curvature of the rims 34c and 35c. A transverse trough 40 is formed with the bar 37 below a gap 41 near the end of the bar on wheel 35, and an elongated channel or guide 42 extends from end to end of the bar 37 to afford means for receiving the applicator tubes upon the left side of the gap 41 and the tampon plug upon the right side thereof. The small tube 43 is to the left of the large tube 44, and it is axially alined with the latter by reducing the transverse dimensions of the portion of guide channel 42 where the small tube 43 rests which thereby provides a shoulder 45 against which the proximate end of the large tube 44 abuts. An injector funnel 46, which tapers internally towards the tube 44, is disposed across the guide channel 42 upon the side of the gap 41 next the tube 44 so that the wide portion of the funnel 46 is towards the cotton plug or tampon 47 beyond the gap 41. When the cotton plug 47 has been deposited in its portion of the guide channel 42, as shown in Figure 19, the withdrawing string 47a of said plug will be in gap 41 and trough 40, and it is adapted, by means of the instrumentalities hereinafter described, to be transferred from the above mentioned portion of the structure and disposed within the tube or tubes of the applicator during the assembling operations.

Figure 14:
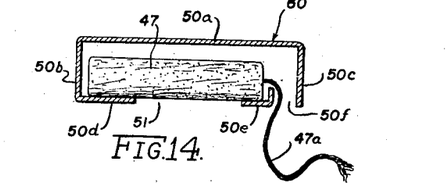
Figure 14 is a sectional view of the chute for the pre-formed plugs taken along line XIV—XIV of Figure 1.

The plugs 47 are preferably compressed cotton which have a form-retaining characteristic and are placed upon a ramp 48 which inclines down towards the rear of the apparatus as shown in Figure 11, from which ramp the plugs roll into and become stacked one upon another in a vertical chute 49 which terminates in a discharge throat 50, and means are provided for feeding the plugs 47 separately from said throat so that each plug will be placed in proper position in an end of a guide channel 42 on the drum 29 which has been registered with the lower end of the throat 50 as shown in Figure 11. The throat 50, as shown in Figure 14, is of bent metal and is of rectangular cross-section comprising a top wall 50a, side-walls 50b and 50c, and a narrow bottom wall 50d extending inward from side wall 50b, and leaving an open space 51, in the bottom of the structure. An angle-metal piece 50e near sidewall 50c provides an open slot 50f for the disposition of the withdrawing string 47a so that it will hang pendant therethrough as shown in Figure 14. When the plug 47 falls into the guide channel 42 the string 47a will be positioned in the gap 41 and through 40 as shown in Figure 19.

The individual feeding of the plugs 47 is accomplished by a feeder finger 52 consisting of a triangular web 53 having a hub 54 at its apex which is secured to a rock-shaft 55 journaled in brackets 56 and 57 on the upper rear portions of the respective side-frames C and D. The web has a segmental flange 58 of the same curvature as that of the throat 50 and moves into the latter during movement of the rock-shaft 55. The forward edge of web 53 is provided with a hook-shaped flange 59 adapted to engage the lower plug in the stack and push it out of the throat and into the registered guide channel 42 of the drum 29. The boss 54 of the finger 52 is provided with a lateral arm 60 which has pivotal connection with the upper end of a pitman 61, and the lower end of said pitman is pivotally connected to the outer end of a rocker-arm 62 projecting from a tube 63 surrounding the cam-shaft 19 between pinion 32 and a stop 64 anchored to said shaft 19. Intermediate its ends the rocker-arm 62 has a roller 65 which engages a cam 66 on shaft 16 and rotates therewith to actuate said rocker-arm 62, which in turn operates the feeder finger 52 at the proper time to free a plug from the bottom of the stack in the chute 49. A spring 62' is interposed between the rocker arm 62 and cross rod 62'' to normally urge rod 61 up.

Alongside the plug ramp 48 there is a wider ramp 67 for the tubes, and which is divided by a central fin 68 to separate the small and large tubes and guide them to their divided chutes 69 and 70 which terminate in curved throats 71 and 72 alining with the respective portions of the guide-channel 42 which is registered with said throats 71 and 72. The chute 69 and its throat 71 which is shown in Figure 15 is similar in all respects to the chute 70 and its throat 72. In the rear vertical wall of the chutes 69—70 there are rectangular openings 73 in which crescent-shaped tube feeders 74, 74, are adapted to move. These feeders 74 have their bosses 74a secured to spaced portions of a rock-shaft 75 which is journaled at its ends in bearings 76 on the rear wall of the chutes 69—70, and intermediate said tube feeders the rock-shaft 75 has a rocker-arm 77 secured to it which is pivotally connected at its outer end to the upper end of a pitman 78 extending downwardly therefrom. The lower end of said pitman 78 is pivotally connected to a long rocker-arm 79 which is rigidly secured to the adjacent end portion of the tube 63 which carries the rocker-arm 62 on shaft 19 for operating the plug feeder, so that all of these feeder devices are coordinated and are operated simultaneously by the rotatable cam 66 on the cam-shaft 16.

When the tubes 43—44 and the plug 47 have been placed in the registered guide groove 42, the said parts of the sanitary article, in disassembled end to end relation to each other, will be opposite the throats 50 and 71, having been discharged during a pause in the intermittent movement of drum 29, as shown in Figures 8 and 11. The next movement of the drum 29 in the direction of the arrows in said figures will position the drum segment supporting the three parts of the article at the top of the drum. During their travel to this upper position the tubes 43—44 will have passed under the free end portions of yieldable holders in the form of leaf springs 80a and 80b which press down upon the upper surfaces of said tubes and maintain them in position during the telescoping thereof and while the plug 47 is being inserted thereinto. These springs 80a and 80b are anchored to brackets 81a and 81b respectively which are secured to one of a pair of elongated guide-rods 82 mounted at their end portions in spaced bosses 83, 83, and 84, 84, at the upper ends of the respective side-frames C and D. These guide rods 82 project a distance beyond their mounting bosses to provide supports for the instrumentalities which are adapted to complete the operation of telescoping the tubes 43—44 and inserting the plug 47 thereinto.

Figure 1:
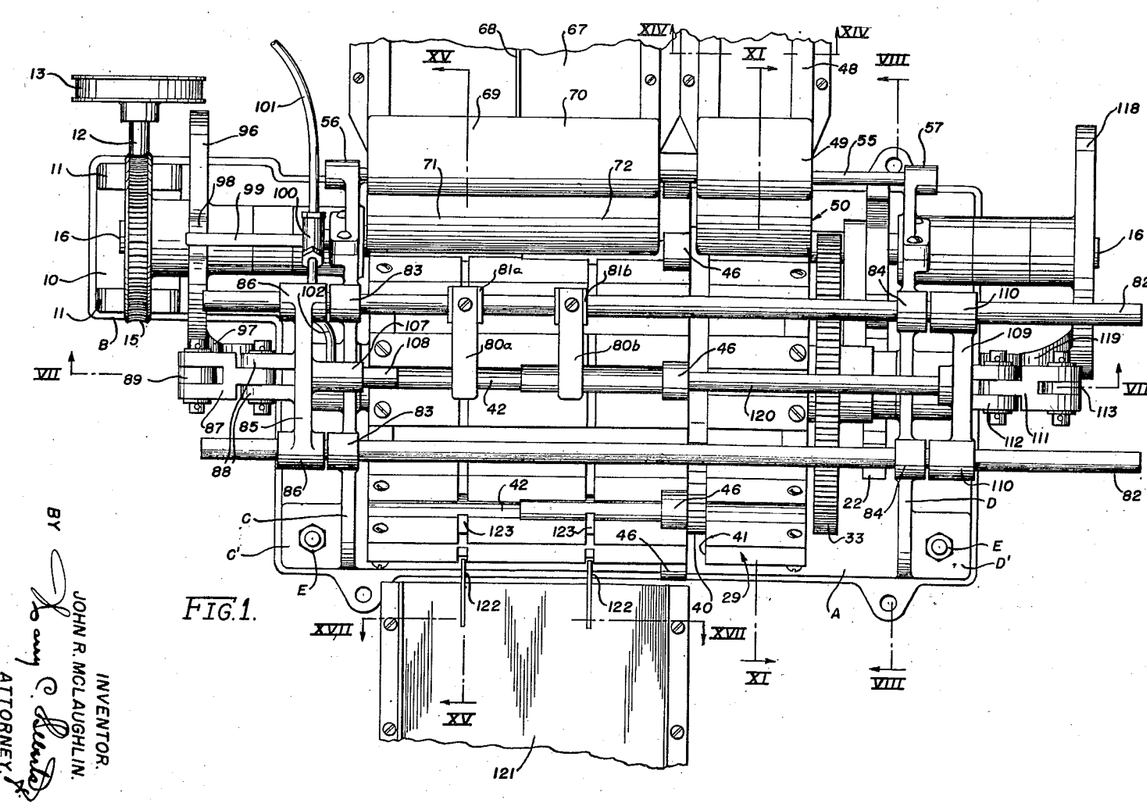
Figure 1 is a top plan view of an apparatus such as contemplated herein for assembling applicator tubes and cotton plugs to produce an article to be used for sanitary purposes.
Figure 2:
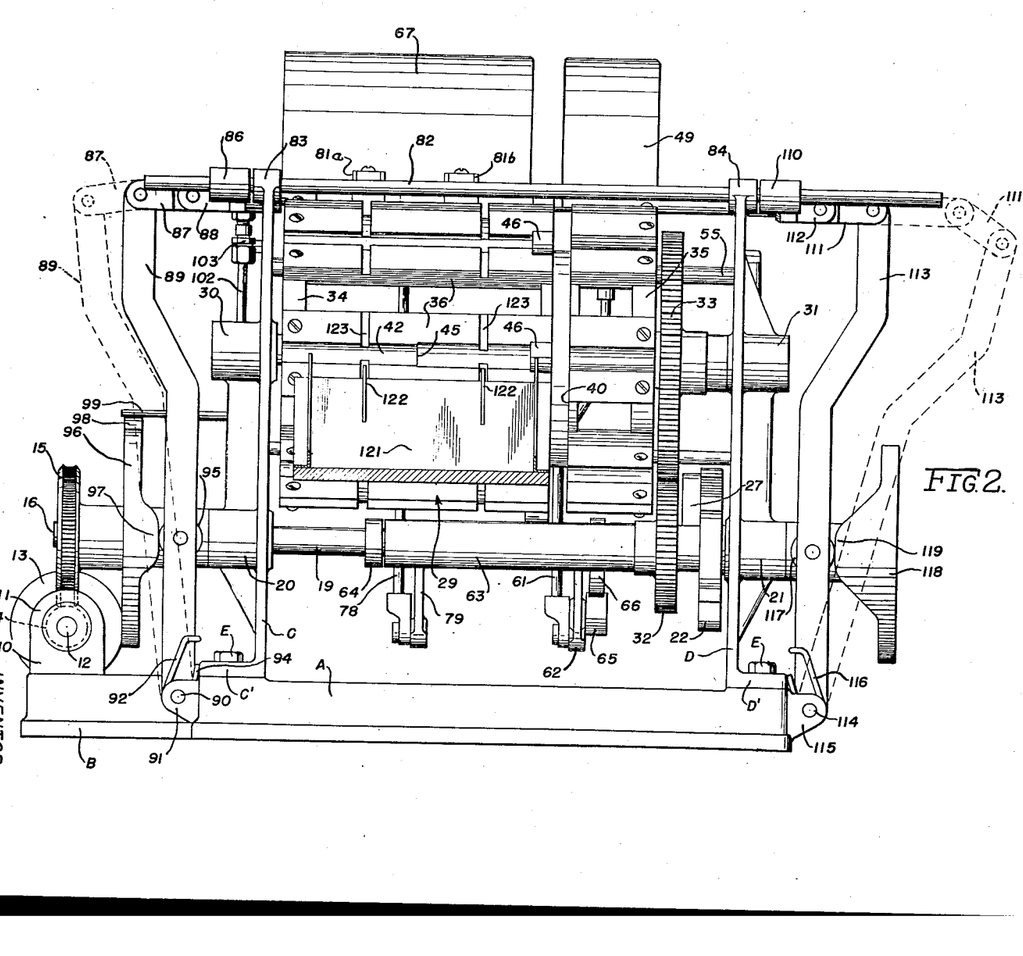
Figure 2 is a vertical elevation looking at the front or discharge side of the apparatus shown in Figure 1.
Figure 3:
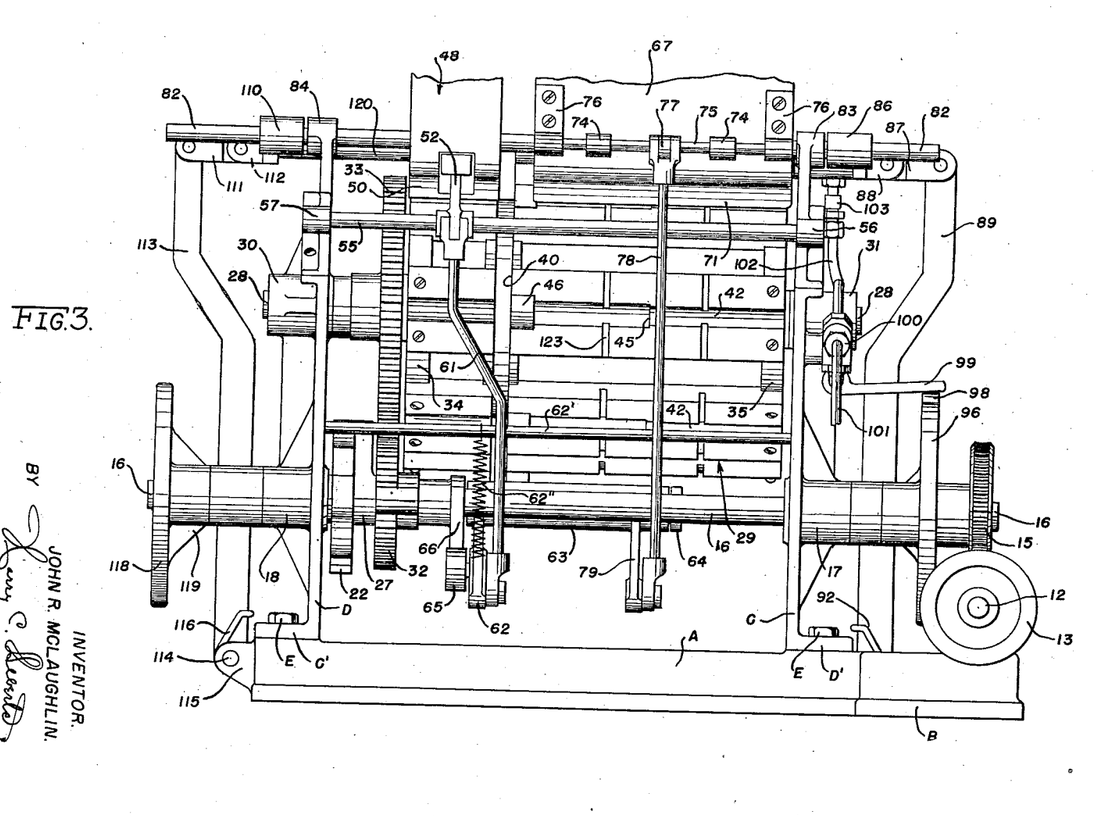
Figure 3 is a vertical elevation looking at the rear or feed side of the apparatus shown in Figures 1 and 2.

A slide which is movably mounted on the extended ends of guide-rods 82 above the side-frame C, consists of a cross-piece 85 having guide-bosses 86, 86, at its ends which are slidably mounted upon said rods 82, and said slide is reciprocated by means of a link 87 pivotally mounted at one end between lugs 88 on the cross-piece 85 and at its other end is pivotally connected to a vertically disposed lever 89. This lever 89 is disposed outside the side-frame C as shown in Figure 2, and has its lower end fulcrumed on a pintle 90 extending between spaced ears 91 projecting from the end edge of the base A. A taut spring 92 of substantially U-shape is looped around the lower portion of said lever 89 and its arms have coils 93 embracing the pintle 90, while the ends 94 of the spring bear against the adjacent portion of the base A so that the lever 89 is urged away from the side-frame C. The lever 89 is provided with a cam-roller 95 engaging with a cam-disk 96 having a single lateral or side-hump 97 to intermittently actuate the lever 89 and reciprocate the slide structure to which the upper end of said lever is connected.

Figure 6:
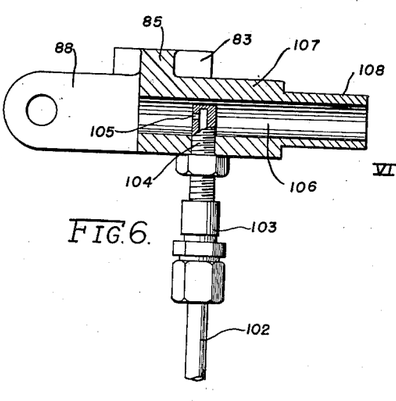
Figure 6 is a section of the string ejector nozzle taken along line VI—VI of Figure 5.

The cam-disk 96 is secured upon and rotates with the main or cam-shaft 16 adjacent the worm-wheel 15, and it has a single edge hump 98 which is adapted to engage the outwardly urged spindle 99 of a control valve 100 mounted on the adjacent outer face of the side-frame C. A pipe 101 leads into the valve 100 from any suitable source of air-pressure, and a flexible pipe 102 leads from the other side of the valve 100 and is attached by a coupling 103 to a nozzle 104 having a laterally disposed orifice 105. As shown in Figure 6 the nozzle 104 extends into the bore 106 of a plunger 107 projecting from the side of the slide cross-piece 85 opposite the pivot lugs 88, and the orifice 105 of the nozzle is faced so that the discharge of compressed air will be in a direction to create suction through the operating end of said plunger. There is a reduced portion 108 at the end of the plunger which is adapted to move in the end portion of the guide-channel 42 to contact the adjacent end of the small tube 43 and urge its other end into the proximate end of the large tube 44. The manner of contact between the end of plunger portion 108 and the tube 43 is such that when the air-pressure starts to discharge through orifice 105 the suction through the tubes 43—44 will be sufficient to suck the light-weight string 47a out of the gap 41 and trough 40 and draw it through the tubes 43—44 as shown in Figure 20. The telescoping of the tube 43 into tube 44 is accomplished due to the fact that the non-telescoped end of tube 44 abuts the adjacent side of the funnel and is thereby prevented from independent movement.

The instrumentalities for forcing the cotton plug 47 into the applicator structure 43—44 are located at the end of the apparatus opposite the structure which has just been described. A second slide, which is movably mounted on the adjacent extended ends of the guide-rods 82 above the side-frame D, consists of a cross-piece 109 having guide-bosses 110 at its ends which are slidably mounted upon said rods 82, and said slide is reciprocated by means of a link 111 pivotally connected at one end between lugs 112 on the cross-piece 109, while the other end of this link 111 has pivotal connection with the upper end of a vertical lever 113. The lower end of this lever 113 is disposed between spaced ears 115 on base A where it is fulcrumed on a pintle 114, and a strong spring 116, constructed and mounted similar to spring 92 for a plunger lever 89, engages the lower portion of said lever 113 in a manner to urge it away from the side-frame D. Lever 113 carries a cam-roller 117 engaging the adjacent face of a cam-disk 118 having a single lateral or side hump 119 which intermittently actuates said lever 113 to reciprocate the slide to which the upper end of said lever is operatively connected. This cam-disk 118 is secured upon and rotates with the main or cam-shaft 16 adjacent the bearing 17 on the side-frame D.

The cross-piece 109 of the slide carries a long plunger 120 which extends in guide-channel 42 to near the end of the plug 47 which is opposite the string 47a, and when the slide is reciprocated said plug 47 is pushed across the gap 44 into the wide end of the funnel and thence into the large tube 44 which is registered with the narrow end of said funnel in the manner shown in Figure 20. The movement of the plug 47 into the tube 44 is simultaneous with the entrance of the small tube 43 into said tube 44, and the placement of the string 47a into the applicator tubes, and said plug 47 is entered far enough into tube 44 so that its inner end will contact the inner end of the small tube 43.

The assembling operation having been completed the drum is given successive rotations until the assembled structure is ready to be discharged onto a chute 121 at the front of the apparatus as shown in Figure 15. In order to prevent clogging of the guide-channel 42 and to insure discharge of each assembled unit from the drum, said chute is provided with upwardly curved strippers 122 projecting from its upper edge, which said strippers enter transverse slits 123 in the outer faces of the drum segments 36 in the manner shown in Figure 15 and eject the assembled structures as they come into engagement.

While this invention has been described in detail in its present preferred form or embodiment, it will be obvious to those skilled in the art, after understanding said invention, that various changes and modifications may be made therein without departing from the spirit or scope thereof. It is aimed in the appended claims to cover all such changes and modifications.

What is claimed is:

1. An apparatus of the kind described, embodying means for feeding tubular and solid members along predetermined parallel paths for assembly; a corresponding number of axially aligned means adapted to receive said members in axial alignment, said means provided with individual supporting seats for said members in spaced axially aligned relation to each other said axially aligned seats for each of said members being in corresponding spaced parallel fixed relation; devices movable in said seats for moving said members relative to each other to dispose the solid members within said tubular members; and intermittently movable means for actuating said devices in timed relation to each other.

2. An apparatus of the kind described, embodying means for feeding tubular and solid members along predetermined parallel paths for assembly; means movable intermittently past said feeding means adapted to receive said members in axial alignment, said intermittent means provided with a plurality of individual supporting seats for each of said members in axially aligned spaced relation to each other; said axially aligned seats for each of said members being in corresponding spaced parallel fixed relation, devices operable in said seats during pauses of said intermittently movable means for inserting said members the one into the other; and intermittently movable means for actuating said inserting devices in timed relation to each other.

3. An apparatus of the kind described, embodying means for feeding a tubular applicator member and a cotton plug member along parallel paths for assembly; a rotatable drum adapted to receive said members, said drum provided with axially aligned supporting seats for said members in axial spaced relation to each other; said axially aligned seats for each of said members being in corresponding spacel parallel fixed relation on said drum, opposing plungers movable in said seats for moving said members relative to each other to insert the plug into said applicator; and means for intermittently actuating said plungers in timed relation.

4. An apparatus of the kind described, embodying means for feeding a tubular applicator member and a cotton plug along parallel lines for assembly; a drum rotatable intermittently past said feeding means to receive said members, said drum provided with axially aligned supporting seats for said members in spaced relation to each other; said axially aligned seats for each of said members being in circumferentially spaced fixed relation on said drum, opposing reciprocable plungers movable in said seats for moving said members relative to each other to insert said plug within said applicator; and cam-operated means for intermittently actuating said plungers in timed relation to each other.

5. An apparatus of the kind described, embodying means for feeding a tubular member and a solid member along parallel paths for assembly; axially aligned means adapted to receive said members in axial alignment, said means provided with individual seats supporting said members in spaced axially aligned relation to each other; said axially aligned seats for each of said members being in correspondingly spaced parallel fixed relation, a funnel interposed between said aligned seats and converging towards said tubular member supporting seats; devices operable in said seats for moving said solid member through said funnel and into said tubular member; and intermittently movable means for actuating said devices in timed relation.

6. An apparatus of the kind described, embodying a rotatable drum provided with axially aligned seats to respectively receive separate members including a cotton plug having a pendent string and a tubular applicator; a transverse gutter between said aligned seats for receiving the string of the plug in the adjacent seat; said aligned seats for each of said members being in corresponding spaced parallel fixed relation on said drum; a plunger adapted to engage and insert said plug into said applicator; a stop adapted to engage the remote end of said applicator; and suction means associated with said abutment adapted to draw said string through said applicator prior to movement of the plug thereinto.

7. An apparatus of the kind described, embodying a rotatable drum provided with axially aligned seats adapted respectively to receive separate members including a cotton plug having a pendent string and a tubular applicator; a plurality of circumferentially spaced axially aligned seats in said drum a transverse gutter between said seats axially aligned for receiving the string of the plug in the adjacent seat; a funnel between said gutter and said applicator seat and converging towards the latter; said aligned seats for each of said members being in correspondingly spaced parallel fixed relation on said drum; a plunger adapted to insert the plug through said funnel and into said applicator; a stop engageable with the remote end of the applicator; and suction means adapted to draw said string through said funnel and said applicator prior to movement of the plug thereinto.

8. An apparatus of the kind described, embodying a rotatable drum provided with a plurality of axially aligned seats adapted respectively to receive separate members including a cotton plug having a pendent string and separate telescopic applicator tubes to dispose the telescopic tubes and plug in axial separated alinement; said aligned seats for each of said members being in correspondingly spaced parallel fixed relation on said drum; a transverse gutter between the plug and the adjacent tube seat for receiving the string; a plunger adapted to insert the plug into the adjacent applicator tube; a plunger adapted to insert the remote tube into the tube receiving the plug; and suction means adapted to draw the string through the applicator tubes prior to insertion of the plug.

9. An apparatus of the kind described, embodying a rotatable drug provided with a plurality of axially aligned seats adapted respectively to receive separate members including a cotton plug having a pendent string and separate telescopic applicator tubes and dispose the same in alinement with each other; said aligned seats for each of said members being in correspondingly spaced parallel fixed relation on said drum; a transverse gutter between the plug and the adjacent tube seat for receiving the string; a funnel between said gutter and the adjacent tube seat and converging towards the latter; a plunger adapted to insert the plug through said funnel and into the adjacent applicator tube; a plunger adapted to insert the remote tube into the tube receiving the plug substantially in simultaneous timed relation with the insertion of the plug from opposite ends; and suction means adapted to draw the string through said funnel and the applicator tubes prior to insertion of the plug.

10. An apparatus of the kind described embodying a rotatable drum provided with a plurality of separate axially aligned seats to receive separate members including a cotton plug having a pendent string and a tubular applicator; said aligned seats for each of said members being in correspondingly spaced parallel fixed relation on said drum; a transverse gutter between said seats for receiving the string of the plug; a plunger adapted to insert said plug into said applicator; an inspirator head adapted to engage the remote end of the applicator; intermittently effective suction means communicating with said inspirator head adapted to draw the string through said applicator prior to the insertion of the plug thereinto, and plunger means for inserting the remote tube into the tube receiving the plug substantially simultaneously from opposite ends of said last named tube.

11. An apparatus of the kind described, embodying a rotatable drum provided with a plurality of axially aligned seats adapted respectively to receive separate members including a tubular applicator and a cotton plug having a pendent string; said aligned seats for each of said members being in correspondingly spaced parallel fixed relation on said drum; a transverse gap between said seats for receiving the string; a tapered guide between said gap and the adjacent tube seat and converged towards the latter; a plunger adapted to insert the plug through said tapered guide into said applicator; an inspirator head adapted to engage the remote end of said applicator; and suction-creating means communicating with said inspirator head adapted to draw the string through said tapered guide and into said applicator prior to insertion of the plug thereinto.

12. An apparatus of the kind described, embodying an intermittently rotatable drum provided with axially aligned member receiving seats; a plurality of separate seats circumferentially spaced on said drum in parallel fixed relation relative to each other; means for intermittently delivering to said seats a cotton plug having a pendent string and a tubular applicator for support in axial alignment on said drum; a transverse gap between said seats for receiving the string; an intermittently operable plunger adapted to insert said plug into said applicator; a stop adapted to engage the remote end of said applicator during insertion of said plug thereinto; and suction means adapted to draw the string through said applicator prior to movement of the plug thereinto.

13. An apparatus of the kind described, embodying an intermittently rotatable drum provided with axially alined member receiving seats; a plurality of each of said aligned seats circumferentially spaced on said drum in parallel fixed relation relative to each other; means for intermittently delivering a cotton plug having a pendent string and a tubular applicator to said seats a transverse gap between said seats for receiving the string; a tapered guide between said gap and the adjacent tube seat and converged towards the latter; an intermittently operable plunger adapted to insert said plug through said guide and into said applicator; a stop adapted to be engaged with the remote end of said applicator; and suction means associated with said stop adapted to draw said string through said applicator and guide prior to movement of said plug towards said applicator.

14. A method of inserting a cotton plug having a string into a tubular applicator, which consists in disposing the plug and the applicator in axial alinement with the string depending between them; drawing the string into the applicator through the medium of an air current traversing the applicator; and effecting relative movement between the plug and the applicator while compressing the former relative to the latter to cause the plug to follow the string into the applicator.

15. A method of inserting a cotton plug having a string into a tubular applicator, which consists in disposing the plug and the applicator in axial alinement with the string depending between them; drawing the string into the applicator through the medium of an air current traversing the applicator; and radially compressing the plug just prior to displacement into the applicator while trailing the string.

JOHN R. McLAUGHLIN.